April 22, 1969 A. P. DENIS 3,439,567
DEVICE FOR REMOVING BROKEN STUDS
Filed Oct. 18, 1966
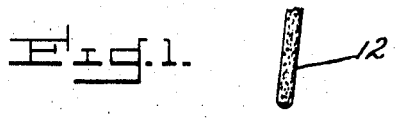
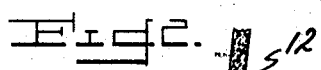
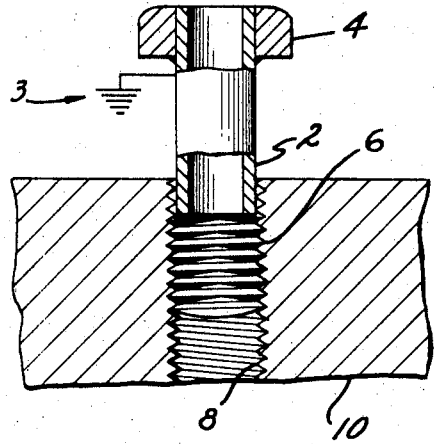
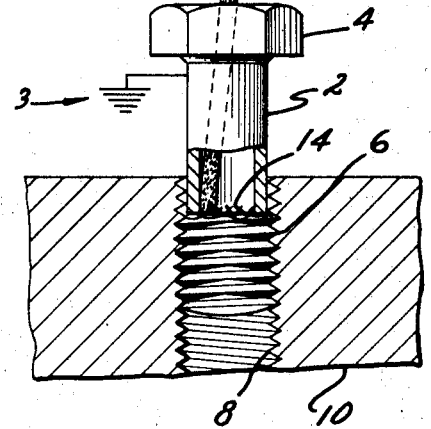
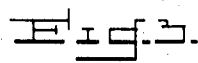
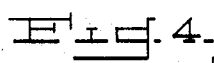
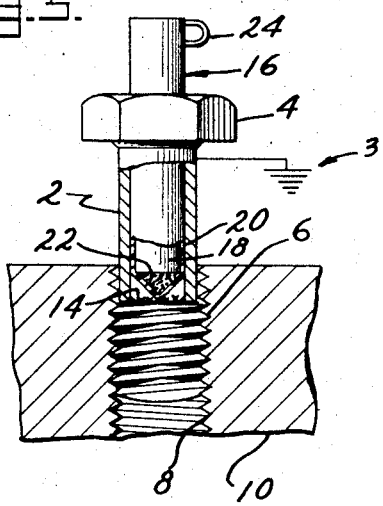
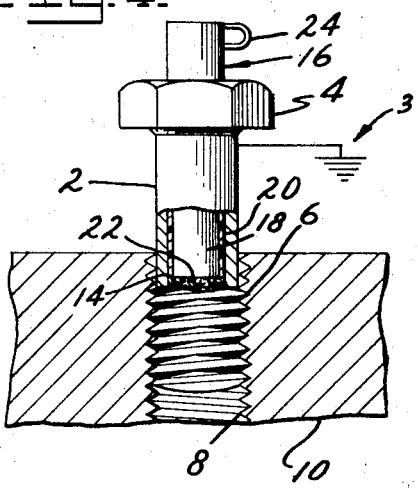
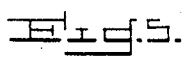
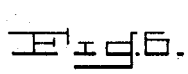
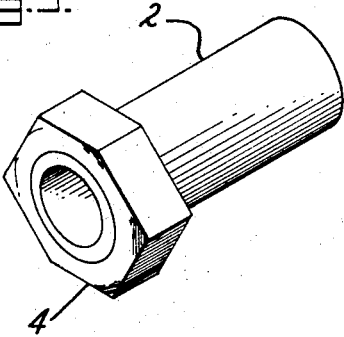
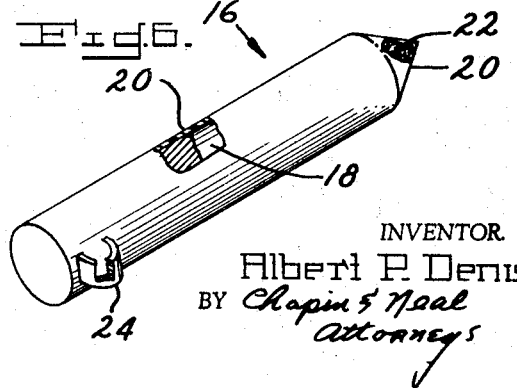
INVENTOR.
Albert P. Denis
BY Chapin & Neal
Attorneys 3,439,567
DEVICE FOR REMOVING BROKEN STUDS
Albert P. Denis, Westport, N.Y., assignor to Robert B.
Denis, Longmeadow, Mass.
Filed Oct. 18, 1966, Ser. No. 587,538
Int. Cl. B25b 13/00; B23p 19/02, 19/04
U.S. Cl. 81—53         2 Claims This invention relates to a cartridge for removing broken stud bolt ends from threaded stud holes.

Difficulties in removing broken studs where the bolt is recessed below the surface of the hole in which it is threaded are well known. A wide variety of prior mechanical devices have been designed as extracting tools to bite into the fractured tip of a broken stud end and to engage the same for turning it out of a hole. Some of the cruder types of prior tools invariably scar the threads of the bolt hole so that re-tapping is necessary for repairing the same and receiving a larger size bolt. Some of the more advanced devices and methods preserve the threaded hole but are generally time-consuming or awkward to employ. The method and device of this invention utilizes a welding tool for easily and accurately extracting a broken stud without the risk of damaging the stud hole threads.

The above principal and more specific advantages and objects of the invention will be appreciated from the following description of the method and device as illustrated by the accompanying drawings in which, FIG. 1 is a sectional view of a broken stud end in a threaded hole with a sleeve inserted for application of the welding tool;

FIG. 2 is a view similar to FIG. 1 showing the sleeve welded to the top of the stud for then turning the broken end out of the hole;

FIGS. 3 and 4 are similar views before and after welding and showing a cartridge device of this invention as used to weld and remove a broken stud;

FIG. 5 is a perspective view of the sleeve element shown by FIGS. 1–4; and

FIG. 6 is a perspective view of the cartridge element of the device of FIGS. 3 and 4.

Referring to FIGS. 1, 2 and 5 the practice of the new method is illustrated using a sleeve 2 of metal having a hex 4 at its upper end. A broken stud 6 is shown with its severed end recessed below the upper surface of the threaded hole 8 in a workpiece indicated at 10. A tip of a suitable welding tool is shown at 12. The sleeve 2 is preferably of a size to slip into the hole 8 easily with a sliding fit, the outer wall diameter being slightly less than the diameter of the hole.

As shown, the open lower end of the sleeve covers the fractured top of a stud 6 (FIG. 1) and the welding tip 12 is then (FIG. 2) inserted into the sleeve to weld the sleeve at its lower end to the stud 6 as seen at 14 in FIG. 2. On completion of the weld the hex 4 may be turned to withdraw the broken stud.

The sleeve 2 of this invention provides a plurality of functions. First of all, the sleeve is grounded as indicated at 3 as by a conventional clamp (not shown). Upon commencing the welding operation by starting an initial arc against the sleeve, the current passes from the ground to the sleeve and then to the stud 6 and not through the workpiece 10 from which the stud is to be removed. This prevents any arcing between the stud 6 and the workpiece 10 which would tend to scar the thread and hamper removal of the stud 6. Secondly, the physical presence of the sleeve also prevents damage to the tapped area of the hole 8 above the stud 6 by direct contact of the arc or spatter from the welding material. A third function provided by the sleeve lies in the fact that once the sleeve is welded to the stud 6 it acts as the implement for removing the stud.

A novel cartridge device for use with a sleeve 12 as shown by FIGS. 1 and 2 is illustrated by FIGS. 3, 4 and 6. As in FIGS. 1 and 2 a sleeve 2 having a hex 4 at its upper end is inserted into a threaded hole 8 in a workpiece 10 into contact with the top surface of the broken stud 6 which is to be removed.

An electrode cartridge, indicated generally by numeral 16, is next inserted into the sleeve 2. As shown by the several views the cartridge 16 comprises a pin 18 of steel or other suitable conductive metal; a dielectric covering shielding the pin as the plastic coating at 20; a tip 22 at one end of the pin having frangible material and preferably being the same as dielectric 20 holding a charge of welding material such as an iron powder indicated at 22 impregnated in a welding flux; and at the opposite end of the pin a connector means such as the tab 24 to electrically connect an electrode to the metal of the pin. The tab 24 is joined directly to the metal of pin 18 through the dielectric coating 20.

In inserting the cartridge into the sleeve the tip 22 comes to rest in contact with the top of stud 6 (FIG. 3). In this position the outer exposed end of cartridge 16 may then be given a sharp rap with a hammer or similar tool so as to break the frangible material of the tip 22 and free the welding material. An electrode is then attached to tab 24. When current is applied the inner end portion of sleeve 2 is welded to the top of stud 6. As in the first example described, by grounding the sleeve current does not pass through the workpiece, and due to the dielectric coating on the pin 18 there is no arcing between the pin and the sleeve 2.

In both examples of the invention as described herein it will be evident that only the lowermost portion of the sleeve (i.e., that which comes in contact with the broken stud) is welded to the stud. Thus the sleeve may be used a number of times simply by cutting off the welded lower end portion thereof.

What is claimed is:
1. A broken stud removing device comprising:
an open ended tubular sleeve metal member adapted for insertion into the open end of a broken stud hole, said sleeve having a head portion at one end thereof for engagement with a torque applying tool,
a metal cartridge of greater length than said sleeve slidably insertable in the bore thereof,
said cartridge having a conductive petal pin coated with a dielectric material and
a frangible pouch enclosure at the lower end of the pin enclosing a charge of welding material impregnated in a welding flux in contact with the metal tip of said pin,
said pin adjacent the opposite end thereof having means for electrically connecting a welding electrode to the metal of said pin outwardly of said sleeve, whereby said sleeve with cartridge inserted therein may be placed in the end of a broken stud hole with the pouch in contact with the top of a stud for striking the outer end of said pin to fracture the pouch and weld the sleeve to the top of the stud.

2. The device of claim 1 wherein said dielectric coating material extends beyond the tip end of said pin and encloses said charge of welding material to form the frangible enclosure therefor.

References Cited

UNITED STATES PATENTS

| | | | |
|---|---|---|---|
| 2,134,705 | 11/1938 | Crecca | 219—99 X |
| 2,268,416 | 12/1941 | Nelson | 219—99 X |
| 2,455,244 | 11/1948 | Evans | 219—99 X |
| 2,752,671 | 7/1956 | Alyea | 29—426 |
| 2,912,890 | 11/1959 | Robinson. | |
| 2,922,542 | 1/1960 | Barr | 219—99 X |
| 3,279,047 | 10/1966 | Cumberland | 29—427 |

OTHER REFERENCES

Oxy-Acetylene Tips, vol. 16, No. 2, February 1937, p. 40 relied on.

CHARLIE T. MOON, Primary Examiner.

U.S. Cl. X.R.

29—240, 427; 219—99; 228—56; 287—20.2